(12) United States Patent
McGee et al.

(10) Patent No.: US 8,614,954 B2
(45) Date of Patent: Dec. 24, 2013

(54) NETWORK PATH IDENTIFICATION

(75) Inventors: Michael Sean McGee, Round Rock, TX (US); Nambi Madhi, Austin, TX (US); Darda M. Chang, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1850 days.

(21) Appl. No.: 11/553,108

(22) Filed: Oct. 26, 2006

(65) Prior Publication Data

US 2008/0101250 A1  May 1, 2008

(51) Int. Cl.
*G01R 31/08* (2006.01)
*H04L 12/26* (2006.01)

(52) U.S. Cl.
USPC ......... 370/241.1; 370/242; 370/246; 370/251

(58) Field of Classification Search
USPC ................ 370/241–242.1, 246–253
See application file for complete search history.

(56) References Cited

U.S. PATENT DOCUMENTS

| | | | |
|---|---|---|---|
| 5,359,597 A | 10/1994 | McLamb et al. | |
| 5,544,150 A * | 8/1996 | Fujimoto et al. | 370/248 |
| 5,646,602 A | 7/1997 | Gertz et al. | |
| 5,878,232 A * | 3/1999 | Marimuthu | 709/249 |
| 5,925,131 A | 7/1999 | Novoa et al. | |
| 6,275,864 B1 | 8/2001 | Mancusi et al. | |
| 6,493,498 B1 * | 12/2002 | Colombo et al. | 385/134 |
| 6,498,791 B2 | 12/2002 | Pickett et al. | |
| 6,615,166 B1 | 9/2003 | Guheen et al. | |
| 6,633,905 B1 | 10/2003 | Anderson et al. | |
| 6,658,586 B1 | 12/2003 | Levi | |
| 6,681,261 B2 | 1/2004 | Mancusi et al. | |
| 6,826,631 B2 * | 11/2004 | Webb | 710/6 |
| 6,859,841 B2 | 2/2005 | Narad et al. | |
| 6,940,821 B1 | 9/2005 | Wei et al. | |
| 6,952,421 B1 * | 10/2005 | Slater | 370/401 |
| 7,006,881 B1 | 2/2006 | Hoffberg et al. | |
| 7,020,166 B2 | 3/2006 | Chien | |
| 7,145,881 B1 * | 12/2006 | Dawes et al. | 370/253 |
| 2001/0055274 A1 | 12/2001 | Hegge et al. | |
| 2002/0041599 A1 | 4/2002 | Chang et al. | |
| 2002/0061018 A1 | 5/2002 | Chien | |
| 2002/0069301 A1 | 6/2002 | Fan et al. | |
| 2002/0097739 A1 | 7/2002 | Chen et al. | |
| 2002/0099816 A1 | 7/2002 | Quarterman et al. | |
| 2002/0105967 A1 | 8/2002 | Chen | |
| 2003/0050998 A1 | 3/2003 | Garnett et al. | |
| 2003/0217123 A1 | 11/2003 | Anderson et al. | |
| 2004/0001479 A1 | 1/2004 | Pounds et al. | |
| 2004/0001501 A1 | 1/2004 | Delveaux et al. | |

(Continued)

FOREIGN PATENT DOCUMENTS

| EP | 1515480 | 3/2005 |
|---|---|---|
| EP | 1641182 | 3/2006 |

(Continued)

*Primary Examiner* — Kibrom T Hailu
*Assistant Examiner* — Benjamin Lamont

(57) ABSTRACT

A method is implemented in a network that comprises a plurality of ports and an indicator associated with each port. The method comprises forming a frame. The frame passes through the network. The frame causes indicators of multiple ports to illuminate to provide an indication of a path through the network Each of the ports remain illuminated for at least a period of time after the frame passes through each such port to enable a person to concurrently visualize all of the ports comprising the path.

19 Claims, 2 Drawing Sheets

(56) References Cited

U.S. PATENT DOCUMENTS

| | | |
|---|---|---|
| 2004/0008622 A1* | 1/2004 | Dolbec et al. ............... 370/223 |
| 2004/0059806 A1 | 3/2004 | Webb |
| 2004/0066759 A1 | 4/2004 | Molteni et al. |
| 2004/0081186 A1 | 4/2004 | Warren et al. |
| 2004/0085974 A1 | 5/2004 | Mies et al. |
| 2004/0162898 A1 | 8/2004 | Rich |
| 2005/0015217 A1 | 1/2005 | Weidl et al. |
| 2005/0044211 A1 | 2/2005 | Adhikari |
| 2005/0073957 A1 | 4/2005 | Lay |
| 2005/0172024 A1 | 8/2005 | Cheifot et al. |
| 2006/0023638 A1 | 2/2006 | Monaco et al. |
| 2006/0023676 A1 | 2/2006 | Whitmore et al. |
| 2006/0104205 A1 | 5/2006 | Strutt et al. |
| 2006/0227725 A1* | 10/2006 | Huotari et al. ............... 370/254 |
| 2006/0285499 A1* | 12/2006 | Tzeng ............... 370/249 |

FOREIGN PATENT DOCUMENTS

| | | |
|---|---|---|
| JP | 63281541 | 11/1988 |
| WO | WO2005071914 | 8/2005 |
| WO | WO2005109754 | 11/2005 |

* cited by examiner

NETWORK PATH IDENTIFICATION

BACKGROUND

In a network, there may be multiple interconnected switches, servers, storage devices, etc. A packet of data can be sent from a source device through one or more intervening switches to a destination device. Each switch typically has multiple switch ports and each server has at least one and possibly multiple network interface controller (NIC) ports. In some cases, the switches, servers, storage devices, etc. are housed in equipment racks. The number of ports and associated cabling in such an environment can be large. In such an environment, determining the configuration of the network can be difficult, thereby burdening network administrators attempting to manage such a network.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

The term "frame" is used in this disclosure in a broad sense to refer to information, in any suitable form, that is passed from one network device to another. A frame may also be referred to as a "packet" by those skilled in the art.

DETAILED DESCRIPTION

Figure 1:
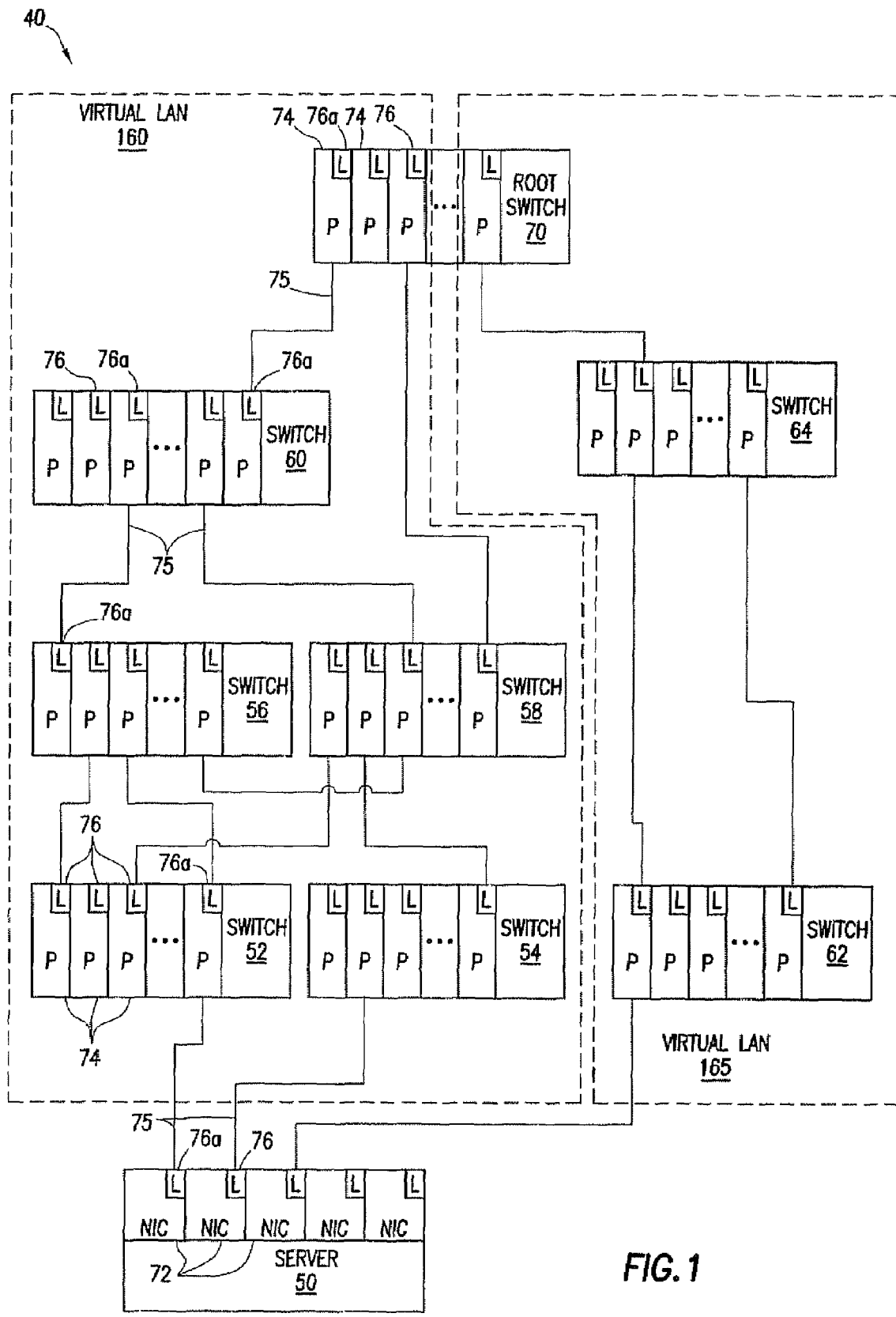
FIG. 1 shows a network in accordance with embodiments of the invention.

FIG. 1 shows a network 40 comprising at least one computer 50 coupled to multiple network switches 52-70. The computer 50 may any suitable type of computer usable to communicate with a network. In at least one embodiment, computer 50 comprises a server and will be referred to herein as such. Server 50 comprises one or more network interface controller (NIC) ports 72 through which the server couples to one or more switches. In some embodiments, each NIC port 72 includes at least one connector to which an external cable can be mated. In other embodiments, the network devices (e.g., server 50, switches 52-70) wirelessly communicate with one another.

Each of the switches 52-70 comprises multiple switch ports 74. Each port includes a connector to which an external cable can be mated, although wireless connectivity is also possible as noted above. Various cables 75 are illustrated in FIG. 1 by which the NIC and switch ports are coupled together as shown. Not every port 72, 74 need be communicatively coupled (e.g., cabled) to another port. A frame of data originating, for example, at server 50 can be routed from port to port through various switches to switch 70. For example, a data frame may pass from server 50 to switch 52, then to switch 56, to switch 60 and finally to switch 70.

In accordance with some embodiments of the invention, the network implements a spanning tree protocol (STP) such as that defined by the IEEE 802.1D standard. A spanning tree uses a spanning tree algorithm that determines that a given switch has more than one path over which to communicate with another node, determines which path is best and blocks other path(s). If one network segment in the STP becomes unreachable, the spanning tree algorithm reconfigures the spanning tree topology and reestablishes the link by activating the standby path. A spanning tree for a network is "loop free" meaning that the switches are not connected together in a way that would permit a frame to be routed through the network in a closed loop.

In a spanning tree protocol, one of the switches is pre-designated or dynamically elected to be a "root" switch. A root switch represents the logical center of the spanning tree topology in a switched network. Switch 70 in FIG. 1 comprises the root switch for network 40. All non-root switches have one root port and one or more designated ports. A root port is the port through which outbound traffic flows from a switch (e.g., switch 52-64) towards the root switch 70. A designated port is a port that connects to and provides in-bound traffic from a local area network (LAN) toward the root switch 70. A port may alternatively be designated a standby port. An alternate port is a port not disabled and is neither root port or designated port and do not forward frames onto the LANs to which it connects. Thus, each port of a switch can be designated as one of multiple possible port types—root port, designated port, standby port. An "active" port is either root port or designated port.

Each NIC and switch port 72, 74 has an associated visual indicator 76. In accordance with at least some embodiments, each visual indicator comprises a light emitting diode (LED) although other forms of visual indication are possible as well. In accordance with embodiments of the invention, an indicator can be made to illuminate. In some embodiments, the illumination of an indicator is implemented by having the LED turn on and remain on for a period of time. In other embodiments, the illumination of an indicator is implemented by causing the indicator to blink at a pre-defined or programmable rate. Further, an indicator can be made to illuminate with a desired color. That is, the color of a given indicator can be one of multiple colors, the selection of which can be made dynamically. Each indicator 76 in an illustrative embodiment is on or near its associated port 72, 74 so that the user can readily determine to which port the indicator pertains. Embodiments of the invention described herein permit a user to readily visualize paths through the networks as well visualize certain types of ports (e.g., all active ports, all root ports, etc.).

The server 50 and switches 52-70 may be implemented in "blade" form and installed in equipment racks. However, any physical form of the server 50 and switches 52-70 is acceptable. Further, the number of servers and switches can be varied from that shown in FIG. 1.

Figure 2:
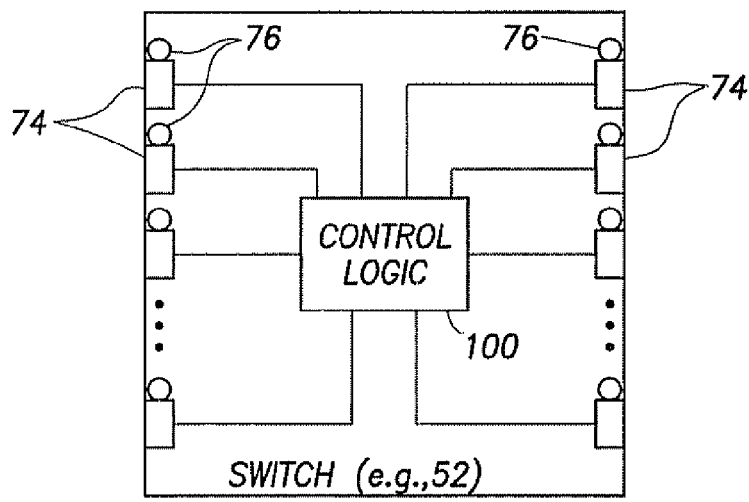
FIG. 2 shows an illustrative embodiment of a switch usable in the network of FIG. 1.

FIG. 2 shows an illustrative embodiment of the switches 52-70. As shown, each switch comprises control logic 100 coupled to each of the switch's ports 74 and associated indicators 76. The control logic 100 comprises a processor executing firmware in some embodiments.

Figure 3:
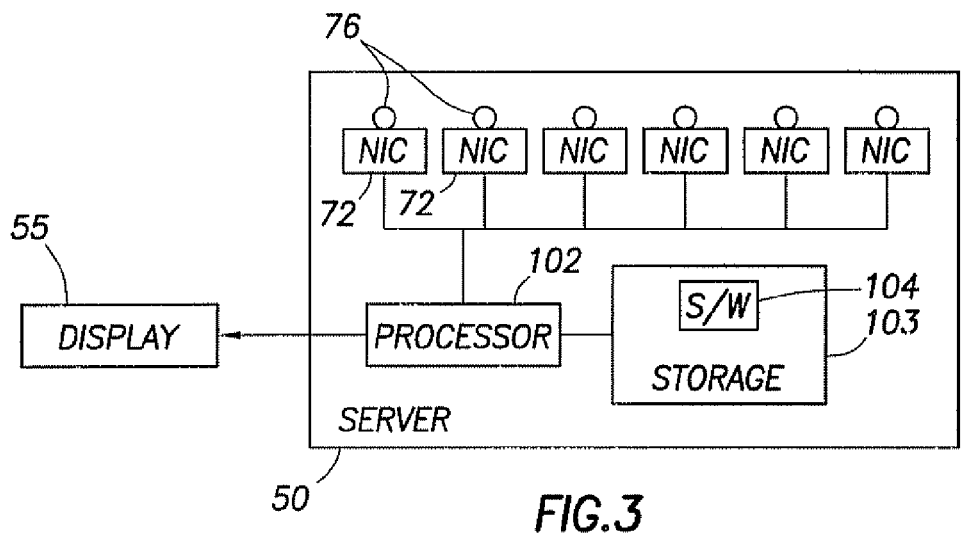
FIG. 3 shows an illustrative embodiment of a server usable in the network of a FIG. 1.

FIG. 3 shows an illustrative embodiment of server 50. As shown, server 50 comprises a processor 102 coupled to one or more NICs 72 and associated indicators 76. A display 55 may also be provided. The processor 102 also couples to storage 103. Storage 103 may comprise volatile storage such as random access memory (RAM), non-volatile storage such as a hard disk drive, compact disk read only memory (CD ROM) and read only memory (ROM), and combinations thereof. Storage 104 may be intended to be removable (such as for a CD ROM) or non-removable such as for a hard disk or RAM memory. Software 104 is provided for execution by processor 102. Software 104 causes the processor 102, and thus server 50, to perform one or more of the actions described herein. The software 104 is contained on any suitable computer readable medium. In the embodiment of FIG. 3, the computer readable medium comprises storage 103 within server 50. In other embodiments, the computer readable medium on which software 103 is stored may be external to server 50. As such, the software 104 may be downloaded to the server 50 for execution thereon.

In accordance with embodiments, a user may desire to visualize certain topological aspects of the network. For example, the user may wish to know through which ports on which switches a packet of data will be routed when being transmitted from server 50 to root switch 70. Other examples are provided below. The user, via server 50, causes the server to form a frame that is encoded with certain information regarding whether and how certain indicators 76 are to be illuminated in the network to provide the user the desired topological visualization. Thus, while the frame may perform other functions as well, the frame, at least in part, causes various indicators in the network to be illuminated. The frame is injected into the network (transmitted from the source node, e.g., server 50, to one or more switches) and is routed from switch to switch until the frame reaches its destination. Every switch that receives the frame, decodes the frame, examines the information contained in the frame and performs whatever indicator illumination activity is specified by the frame. The switch then forwards the frame on to another switch in accordance with routing information contained in the frame.

Figure 4:
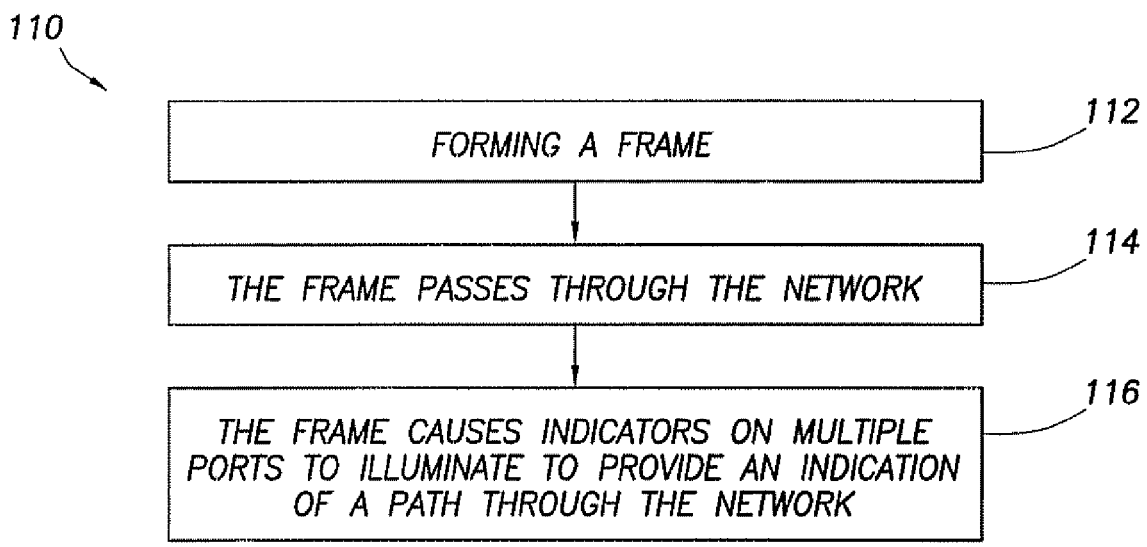
FIG. 4 shows a method in accordance with embodiments of the invention

FIG. 4 provides an illustrative embodiment of this process. A method 110 is shown comprising actions 112-116. At 112, method 110 comprises forming a frame. An exemplary frame format is provided below. The frame is formed to include information that, when received by a switch or other network device, causes such device to illuminate one or more of its indicators 76. The frame also includes information from which the receiving switch determines whether to forward the frame on to another network device (e.g., another switch). Thus, in accordance with method 110, the frame passes through the network (114) and causes various indicators on multiple ports to illuminate (116). The indicators that are caused to illuminate may be, for example, to visually identify a path the frame took as its passed through the network. A user (e.g., a network administrator) can cause the frames to be generated so as to visually identify various ports and paths of interest in the network. The user forms the frames via, for example, a graphical user interface (GUI) provided on display 55 by software 104.

The frame formed in FIG. 4 can cause any one or more of the following actions to happen:

The frame may cause an indicator associated with each port in the network through which the frame passes to illuminate.

The frame may cause indicators associated with some or all "root" ports to illuminate. A root port being a port of a network switch through which frames can be sent toward a root node.

The frame may cause indicators to illuminate comprises causing all active ports in the network to illuminate.

The frame may cause indicators to illuminate of ports along a network path to a specified address.

The frame may cause indicators on some or all ports in the network to illuminate that are registered for a specified multicast stream such as Internet Group Management Protocol (IGMP).

The frame may cause all ports in a specified virtual local area network (VLAN) to be illuminated. For example, FIG. 1 illustrates to VLANs 160 and 165.

The GUI provided by server 50 on display 55 provides the user with a list of choices that correspond to, for example, the aforementioned list. The user selects the desired options (e.g., by clicking on one or more of the selectable options). Upon clicking on, for example, "OK" software button, the server's software forms a frame in accordance with the user's choices and injects the frame into the network.

Each frame may effectuate one of the aforementioned actions to occur. Other actions are possible results as well. The user can cause a series of such frames to be generated and injected into the network to cause a series of such results to occur. In other embodiments, a frame may cause more than just one result to occur. Thus, combinations of results may be encoded into a single frame as desired.

Each network device (e.g., switch) may generate a reply frame that indicates the status associated with the indicator that was targeted by the frame to which the reply pertains. The status may be, for example, that the indicator has currently illuminating, has stopped illuminating, that the specified blinking rate is invalid, that the indicator cannot start illuminating, or that the indicator is unable to stop illuminating. Other status is possible as well.

In accordance with at least one embodiment of the invention, multiple frames may be formed and injected into the network to cause various indicators 76 to be illuminated as desired. In one such embodiment, a first frame is formed per action 112 (FIG. 4) that specifies the types of ports whose indicators are to be illuminated. The port types can be ports such as those listed above (e.g., all ports through which the frame passes, all root ports, all ports in a specified VLAN, all ports along a path to a specified address, all active ports, etc.). Each network device (e.g., switch) that receives such a frame, illuminates certain of its indicators in accordance with the information specified in the frame. The network device may also forward the frame on in accordance with routing information provided in the frame. A second frame may also be formed in accordance with action 112 (FIG. 4) to provide additional information about the illumination of the various indicators. Such second frame specifies, for example, how the indicators are to be illuminated (e.g., blinking rate, color, etc.). Thus, more than one frame can be formed and passed through the network per FIG. 4 to identify certain ports to a user. In other embodiments, a single frame can be formed that specifies the types of ports whose indicators are to be illuminated as well as information regarding how the indicators are to be illuminated.

In one embodiment, the frame formed in accordance with method 110 (FIG. 4) is formed as provided in the following example. Table I below provides an example of a suitable format of such a frame.

TABLE I

Frame Format

| Octets | Field Name | Field Description |
|---|---|---|
| 6 | Destination Address | Multicast Configuration Address |
| 6 | Source Address | Port MAC address |
| 2 | Length/Type | Length or type value |
| 1 | Ver. No. | Version number |
| 1 | Type Length Value (TLV) | |
| 1 | Length | The number of bytes to follow |
| N | . | |
| | . | |
| | . | |
| 4 | FCS | Frame CheckSum |

The frame format in Table I is typical of Ethernet frames. To identify to the network a frame whose purpose to cause indicators to illuminate, the destination address is selected to be a reserved set of multicast addresses. In some embodiments, the destination address is selected from the range of addresses of 01-80-C2-00-00-02 to 01-80-C2-00-00-0F. The source address is the Port MAC address of the server 50, or whatever device originated the frame. The length/type field specifies type value in Ethernet Encapsulation standard. The version number field specifies the version number of the relevant unit identifier (UID) protocol. The type length value (TLV) field is used to encode information that specifies the nature of a data "payload." The length field specifies the amount of the data payload that follows the TLV and Length fields. Based on the value of the TLV and Length fields, the device receiving the frame knows how to decode and interpret the contents of the data payload. The frame checksum (FCS) ensures that the frame was received without error. The frame ends with a TLV type set to a predefined "terminator" value (e.g., 0) and Length field also at a predefined value (e.g., 0).

As explained above, one of the indicator-related frames may comprise information about how the indicators are to be illuminated. In such a frame, the TLV specifies that an indicator to be illuminated is to be illuminated according to a prescribed set of characteristics. The characteristics regarding how the indicator is to be illuminated are provided in the data payload following the length field. Table II below provides an example of such data payload. The first two fields provided below are the TLV Type and Length fields provided in Table I. The remaining fields comprise the data payload that follows the Length field.

TABLE II

Illumination Method

| Octets | Field | Description |
|---|---|---|
| 1 | TLV Type | 1 = Blink Method |
| 1 | Length | Blink Method Information Length |
| 6 | System ID | Sender's System ID |
| 1 | UID Request/Reply | Request<br>0 = stop blinking<br>1 = start blinking<br>Reply<br>2 = stop blinking complete |

TABLE II-continued

Illumination Method

| Octets | Field | Description |
|---|---|---|
| 1 | Status | 3 = start blinking complete<br>0 = OK<br>1 = cannot start blinking<br>2 = cannot stop blinking<br>3 = invalid blinking rate |
| 1 | Blinking Rate: number of blinks | Number of blinks |
| 1 | Blinking Rate: number of seconds | Per the number of seconds |
| 1 | Illumination Color | 0 = Green<br>1 = Amber<br>2 = Red<br>3 = Yellow |

The system identifier (ID) identifies the system that originates the frame. The UID Request/Reply field comprises either a request or a reply as indicated. As a request, the field comprises a value of 0 or 1 to request an indicator to stop or start blinking, respectively. As a reply, the field comprises a value of 2 or 3 to indicate that the blinking has stopped or started, respectively. The Status field comprises a value of 0-3. A value of, for example, 0 is an "OK" status to indicate that the received network device functions normally with the request. A status value of, for example, 1 indicates that the indicator cannot be made to start blinking, while status values of 2 and 3 indicate, respectively, that the indicator cannot be made to stop blinking and that the blinking rate specified in the next fields is invalid (e.g., a switch may not support the blinking rate specified by the frame).

The indicator can be made to blink if desired. In the embodiment of Table II, the blinking rate is provided in two frames to specify a number of blinks per unit of time. The number of blinks is specified in a first blinking rate field while the unit of time for the blinks to occur is specified in a second blinking rate field. The color for the indicator, to the extent the network device containing the indicator can support more than one color, is specified in the Illumination Color field. Values of 0-3 specify, for example, green, amber, red, and yellow, respectively.

In accordance with other embodiments, the frame can be encoded so as to target a root switch. In such embodiments, the UID Request/Reply field (Table II) can be encoded with one of the following exemplary values:

0=blink port on which frame is received if switch is the root
1=blink all ports for the VLAN if switch is the root
2=blink a "management LED" on switch if switch is the root Similar formats can be used for a Root Port, Root Path, VLAN Path, MAC Path, IGMP Path, Router Path, etc. to illuminate a remote point or a particular path.

The above discussion is meant to be illustrative of the principles and various embodiments of the present invention. Numerous variations and modifications will become apparent to those skilled in the art once the above disclosure is fully appreciated. For example, the ports being illuminated in accordance with methods disclosed herein may be located in a common data center (e.g., the same room). However, the illuminated ports may be geographically separated (e.g., different buildings, different cities). It is intended that the following claims be interpreted to embrace all such variations and modifications.

What is claimed is:

1. A method implemented in a network comprising a plurality of ports, an indicator associated with each port, comprising:

forming a frame;

said frame passing through the ports in said network, wherein each port has its own corresponding indicator apart from indicators of all other ports; and said frame causing an indicator of each port through which the packet frame passes to illuminate, wherein the illuminated indicators identify the frame's path through the network;

wherein each indicator remains illuminated for at least a period of time after said frame passes through the corresponding port.

2. The method of claim 1 wherein said frame causing said indicators to illuminate comprises causing indicators associated with all root ports to illuminate, each root port being a port of a network switch through which frames can be sent toward a root node.

3. The method of claim 1 wherein said frame causing indicators to illuminate comprises causing some or all active ports in said network to illuminate.

4. The method of claim 1 wherein said frame causing indicators to illuminate comprises causing indicators of ports along a network path to a specified address to illuminate.

5. The method of claim 1 wherein said frame causing indicators to illuminate comprises causing indicators on some or all ports in said network to illuminate that are registered for a specified multicast stream.

6. The method of claim 1 wherein said frame causing indicators to illuminate comprises causing at least some ports in a specified virtual local area network (VLAN) to be illuminated.

7. The method of claim 1 further comprising forming a reply frame that indicates status associated with the indicator.

8. The method of claim 1 further comprising each of a plurality of switches receiving said frame, causing at least one indicator of said switch to illuminate and then forwarding the frame on to another of said plurality of switches which causes an indictor to illuminate.

9. A network, comprising:

a plurality of switches, each switch having a plurality of ports and a plurality of indicators, each port having a separate associated indicator, and at least one switch coupled to a server; and wherein said switches receive a frame from a server, said frame being received by at least one switch, but not all switches, wherein the frame causes an indicator associated with a port through which the frame passes to illuminate to provide an indication of a path of the frame through said network, wherein not all indicators on the at least one switch that receives the frame are caused to be illuminated by the frame; and wherein each of said indicators remains illuminated for at least a period of time after said frame passes through each associated port.

10. The network of claim 9 wherein said frame causes indicators associated with all root ports in said, network, to illuminate, each root port being a port of a switch through which frames can be sent toward a root node.

11. The network of claim 9 wherein said frame causing indicators to illuminate comprises causing indicators of ports along a network path to a specified address to illuminate.

12. The network of claim 9 wherein said frame causing indicators to illuminate comprises causing indicators on all ports in said network to illuminate that are registered for a specified multicast stream.

13. The network of claim 9 wherein the frame specifies a blink rate for each indicator the frame causes to be illuminated.

14. A non-transitory computer readable medium containing software that, when executed by a processor, causes the processor to:

provide a plurality of selectable options to a user, wherein said selectable options comprise at least a first option to visually identify ports along a path through a network;

in response to user selection of said first option, forming a frame to be routed along said path through the network, said frame causing indicators of multiple ports to illuminate to provide a visual indication of said path through said network;

wherein some, but not all, indicators of ports are illuminated by the frame.

15. The non-transitory computer readable medium of claim 14 wherein said options also comprise an option 1o visually identify root ports only in said network.

16. The non-transitory computer readable medium of claim 14 wherein said options also comprise an option to visually identify all active ports in said network.

17. The non-transitory computer readable medium of claim 14 wherein said options also comprise an option to visually identify all ports along a network path to a specified address.

18. The non-transitory computer readable medium of claim 14 wherein said first option causes ports along said path through which said frame passes to illuminate.

19. The non-transitory computer readable medium of claim 14 wherein said software also permits a user to select a blink rate or color of visual indicators in said network to visually indicate said path.

* * * * *

UNITED STATES PATENT AND TRADEMARK OFFICE
CERTIFICATE OF CORRECTION

PATENT NO.         : 8,614,954 B2                                    Page 1 of 1
APPLICATION NO.    : 11/553108
DATED              : December 24, 2013
INVENTOR(S)        : Michael Sean McGee et al.

It is certified that error appears in the above-identified patent and that said Letters Patent is hereby corrected as shown below:

In the Claims:

In column 7, line 6, in Claim 1, after "the" delete "packet".

In column 7, line 38, in Claim 8, delete "indictor" and insert -- indicator --, therefor.

In column 8, line 7, in Claim 10, delete "said," and insert -- said --, therefor.

In column 8, line 33, in Claim 15, delete "1o" and insert -- to --, therefor.

Signed and Sealed this
Sixth Day of May, 2014

Michelle K. Lee
*Deputy Director of the United States Patent and Trademark Office*